United States Patent Office

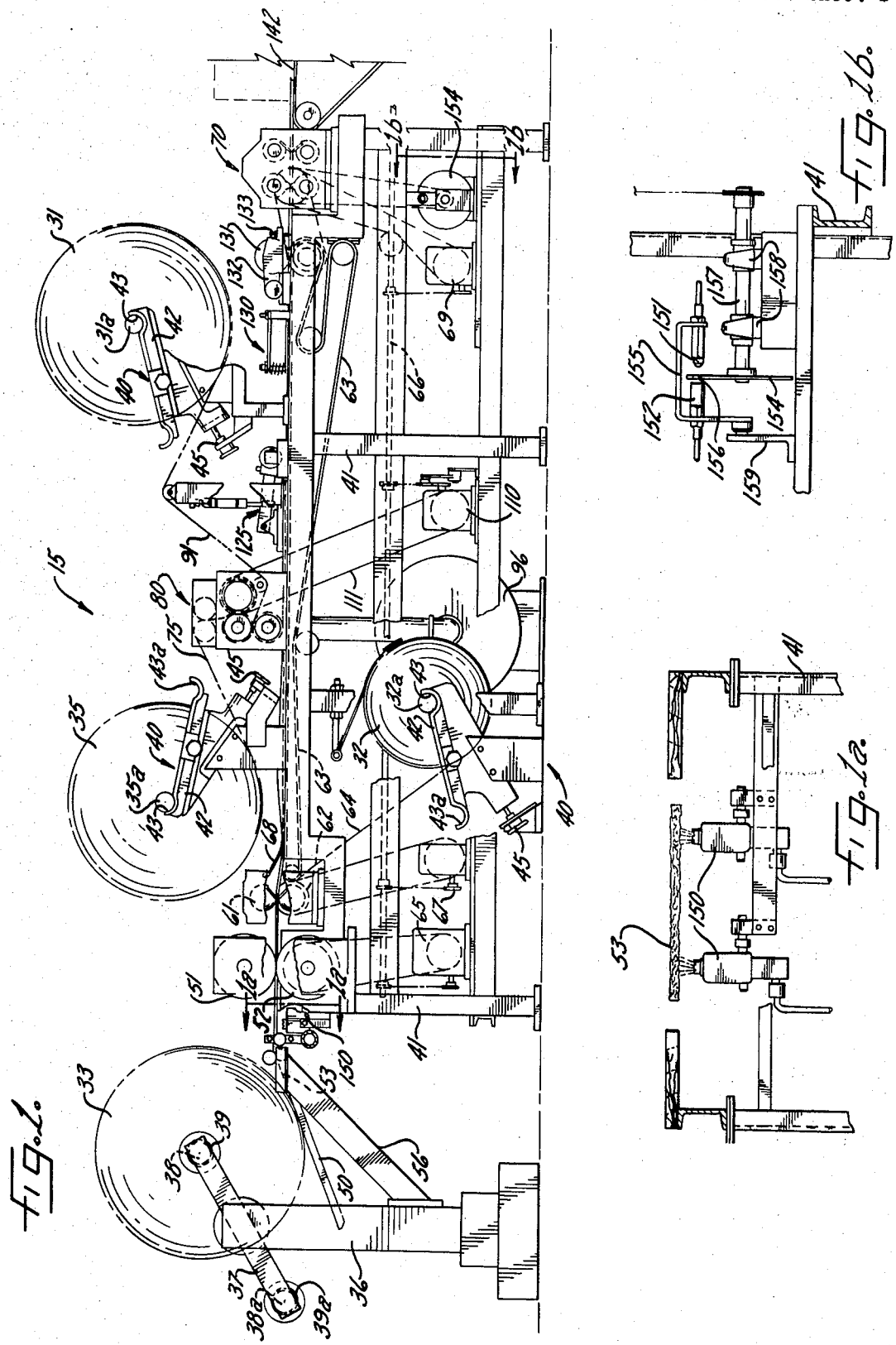

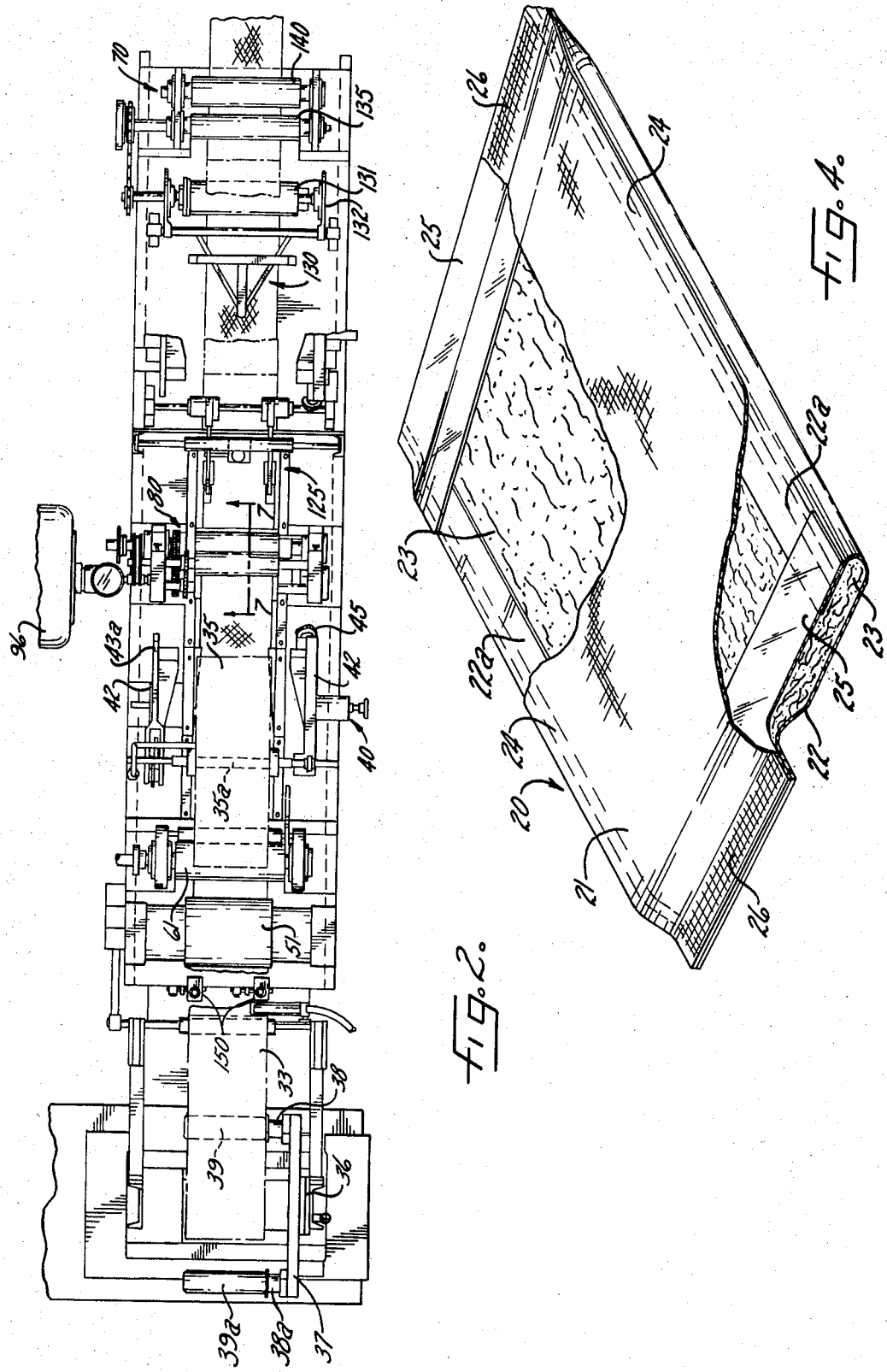

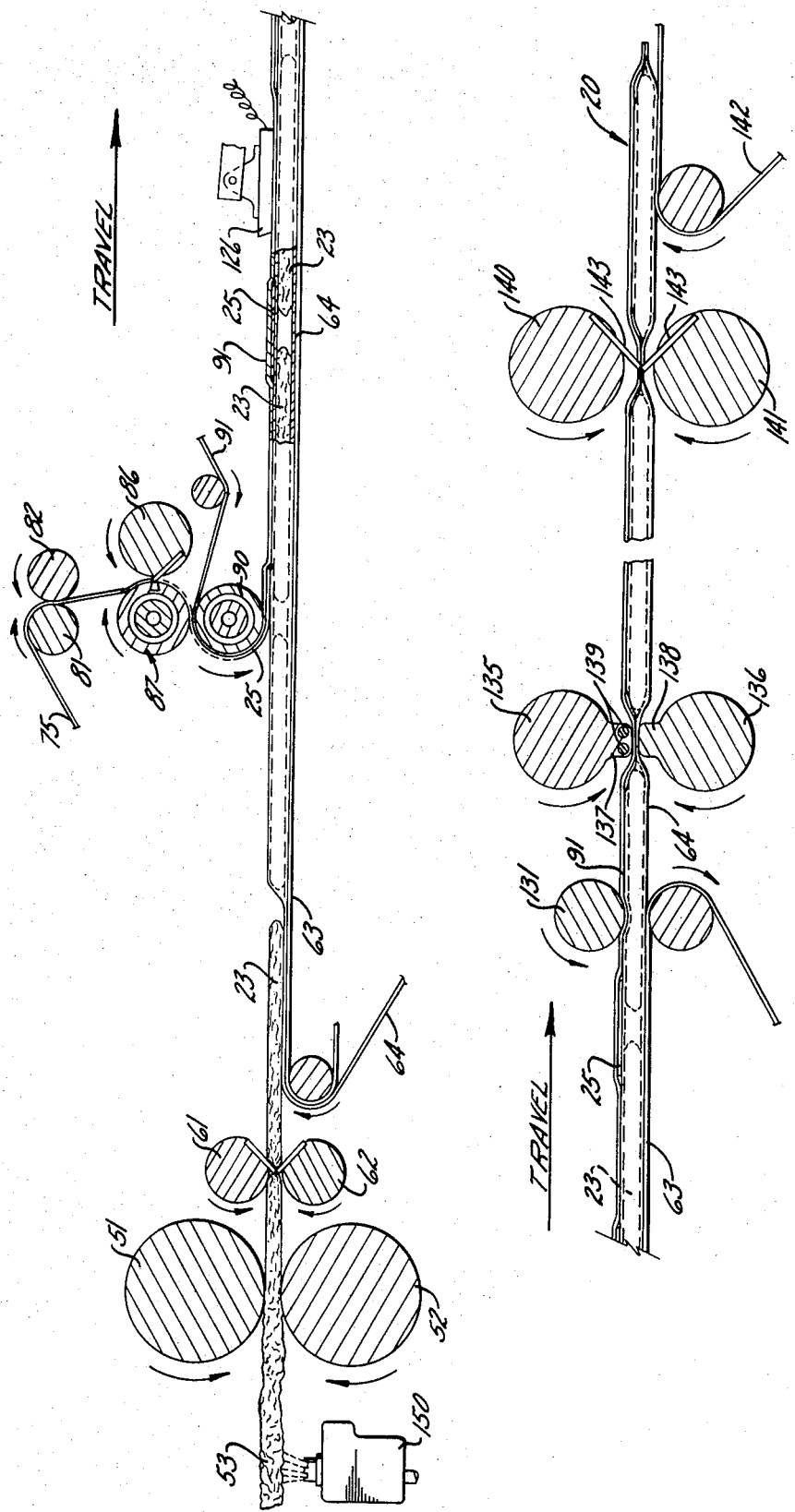

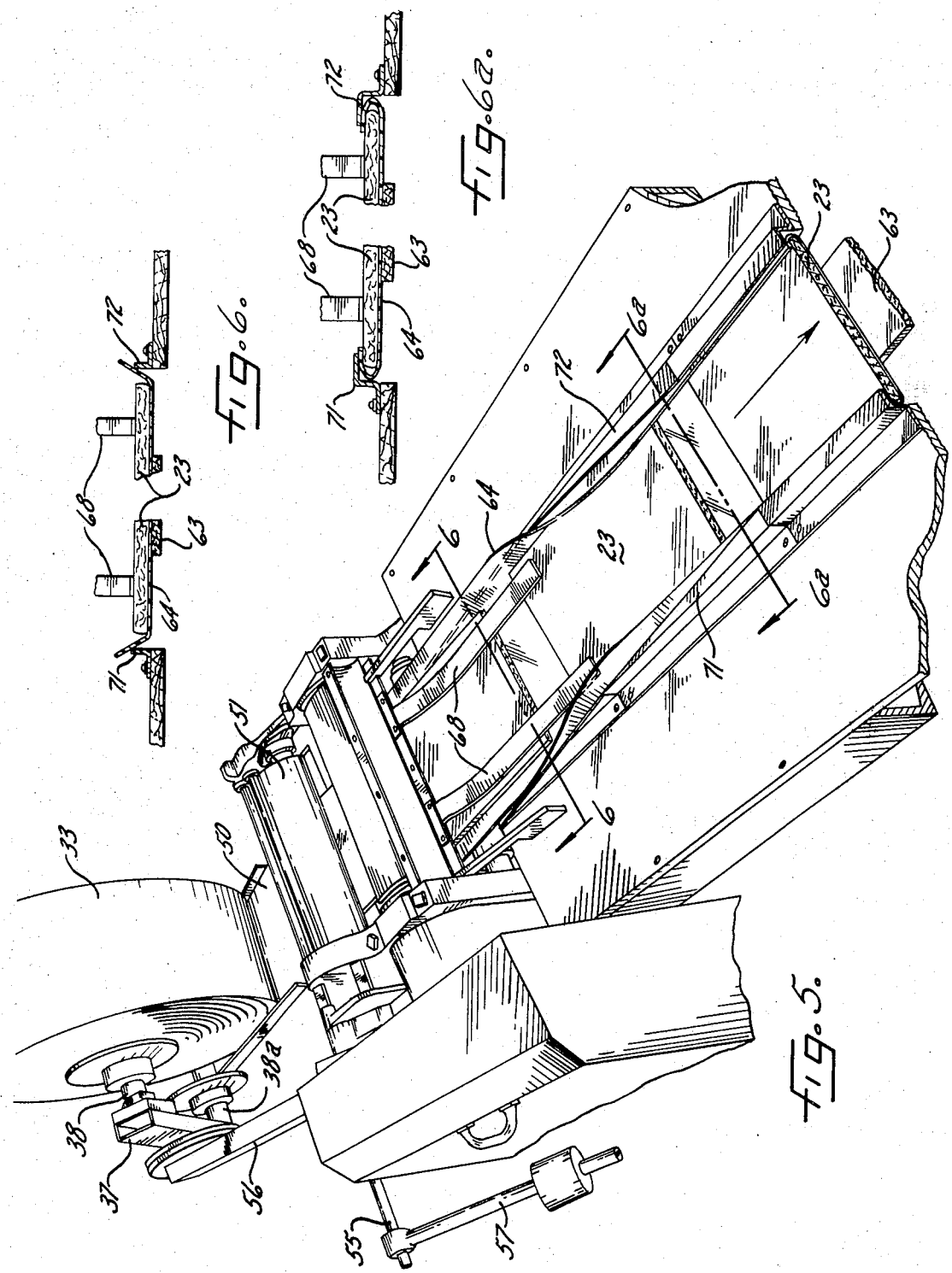

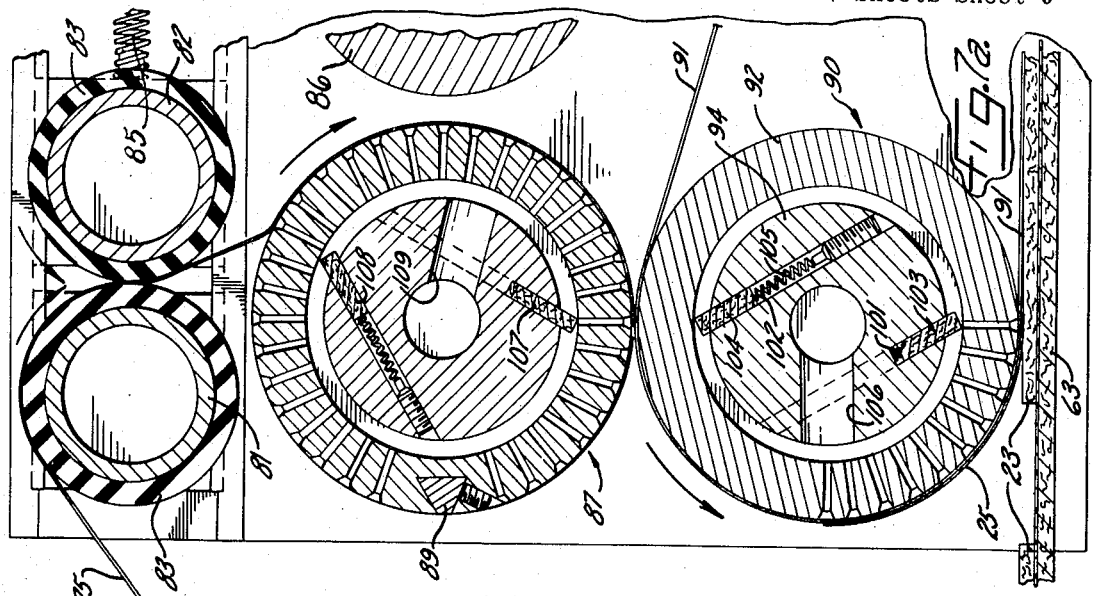

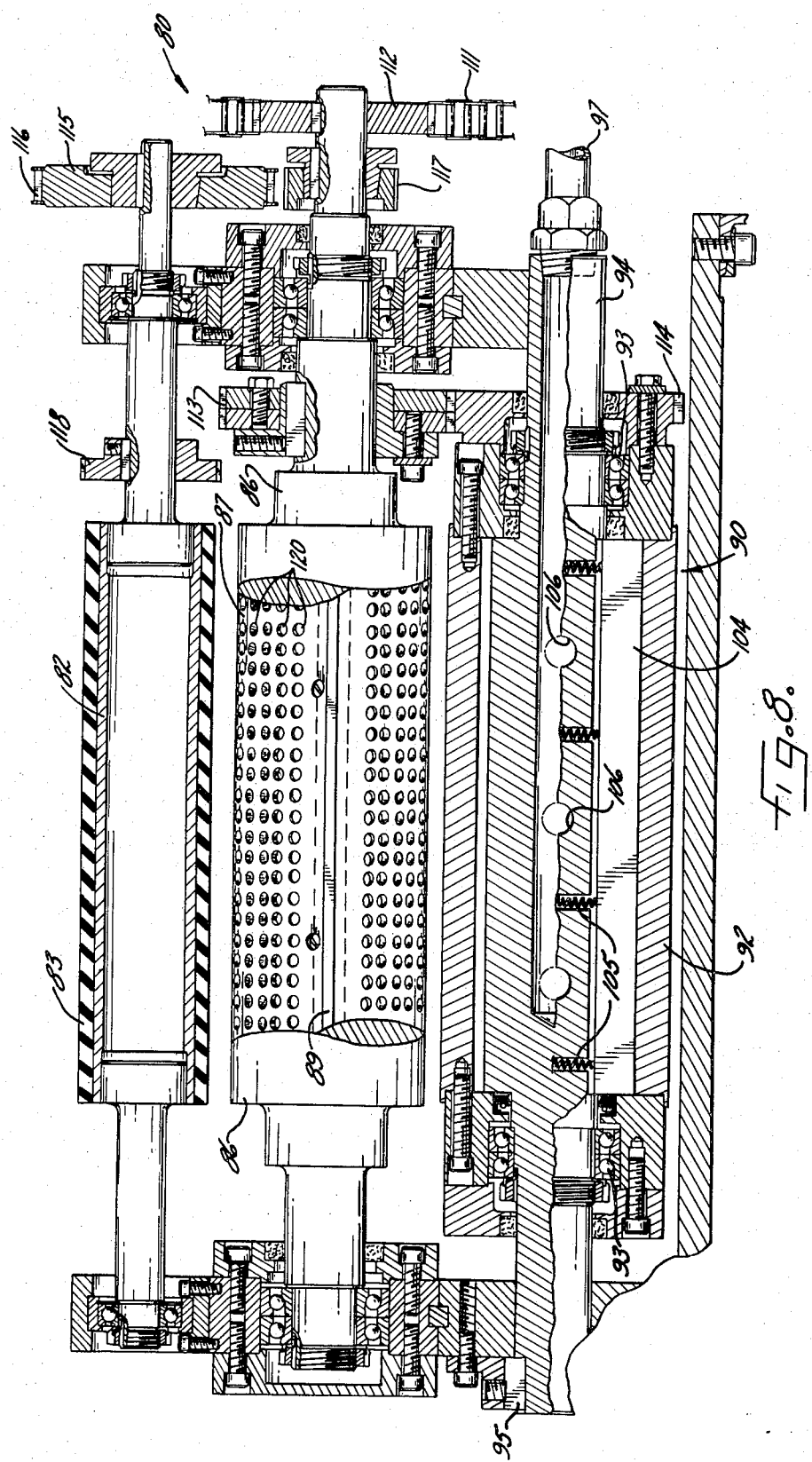

3,758,363
Patented Sept. 11, 1973

1

3,758,363
APPARATUS FOR FORMING DISPOSABLE
DIAPERS
Richard H. Frick, Neenah, Wis., assignor to Kimberly-Clark Corporation, Neenah, Wis.
Original application Nov. 18, 1968, Ser. No. 776,580, now Patent No. 3,629,039. Divided and this application June 24, 1971, Ser. No. 156,467
Int. Cl. B32b 7/00, 31/10
U.S. Cl. 156—383                         5 Claims

ABSTRACT OF THE DISCLOSURE

A method and apparatus for inserting a leak preventing barrier of thin impervious material between the fluid pervious cover sheet and the absorbent core of a disposable diaper is disclosed. The barrier, which preferably comprises a narrow strip of thin plastic film affixed between the cover sheet and the backing sheet along a transverse heat-seal line at each end of the diaper, is first drawn from a continuous supply roll and cut into lengths twice as long as desired. Each cut length is then placed across the ends of two adjacent core pads moving along a conveyor path in end-to-end relation prior to applying a continuous cover sheet over the pads. When the material between pads is heat-sealed and cut transversely to form the individual diapers, the strip is also cut in half so that one half forms the barrier for the rear end of the leading diaper, while the other half forms the barrier for the front end of the next following diaper. In its preferred form the barrier supply, cutting and placing apparatus includes a pair of vacuum rolls with valving driven in timed relation to movement of the core pads. Also disclosed is a method and apparatus for preliminarily applying limited quantities of perfume to discrete locations on the core pads before application of the barrier strip such that the perfumed portion of the pad is sandwiched between the impervious backing sheet and the impervious barrier strip.

---

This is a divisional application of an application of Richard H. Frick, Ser. No. 776,580, filed Nov. 18, 1968, which is now U.S. Pat. No. 3,629,039.

In the customary methods for manufacturing disposable diapers, three continuous webs of material are fed through the processing machine. These webs comprise an upper fluid-pervious cover sheet of soft fibrous material, a lower fluid-impervious backing sheet which is usually a plastic film, and a central absorbent core of substantial thickness usually comprised of wood pulp fluff or plies of cellulose wadding. The outer edges of the cover sheet and backing sheet are continuously attached to each other by embossing; by overfolding and heat sealing; by adhesive attachment; or the like. Following some type of edge sealing operation, the continuous strip formed from the operation is cut into suitable diaper lengths and the ends either left unsealed with a raw cut edge, or sealed by embossing, stamping, and/or heat sealing. In another type of operation, the absorbent core may be pre-cut into pads of a predetermined size and deposited at intervals on the backing or cover sheet before edge-sealing, with subsequent transverse cutting and sealing operations being timed to take place at the interval between pads.

In either of the above operations, it is relatively easy to fold the longitudinal edges of the fluid-impervious backing sheet, in either over- or under-lapping relationship to the cover sheet, whereby an edge channel or dam is provided along both edges of the diaper to prevent edge leakage of fluids from the absorbent core. However, it is a difficult and costly operation to perform a folding operation on the backing sheet, which operation is designed to fold the front and back ends of the sheet over the leading and trailing edges of the absorbent core, after the continuous assembly has been cut into diaper-size sections. As a result, while the side edges of commercial diapers now comprise folded over portions of the backing sheet to provide leakage inhibiting means along the edges; the front and back ends of the diapers are usually either merely pinched shut and heat-sealed, or left open. However, none of these arrangements provide positive end seals and serious leakage problems often exist at these ends.

Accordingly, it is the primary aim of the present invention to provide a method and apparatus for inserting a fluid-impervious barrier strip under the fluid-pervious cover sheet and over each end of the absorbent core of a disposable diaper prior to sealing the edges and ends of the diaper.

It is a more particular object to provide a method and apparatus for cutting double-sized strips from a continuous supply roll of barrier material, and placing the strips over the space between the adjacent ends of two moving pads of core material as well as over the ends of the core pads prior to bonding and transversely cutting the material between adjacent core pads to form individual sealed diapers.

Another object of the invention is to provide a method and apparatus for applying controlled quantities of perfume to the absorbent core of the diaper at discrete locations which are subsequently faced on one side by the fluid-impervious backing sheet and on the other side by the fluid-impervious barrier strip adjacent the ends of the diaper.

Other objects and advantages of the invention will become more readily apparent upon reading the following detailed description and upon reference to the drawings in which:

FIG. 1 is a side elevation of a preferred form of the diaper blank forming machine of the present invention;

FIGS. 1a and 1b are, respectively, enlarged fragmentary sections taken along lines 1a—1a and 1b—1b in FIG. 1;

FIG. 2 is a plan view of the machine shown in FIG. 1;

FIG. 3 is an enlarged two part schematic side elevation illustrating the operation of the principal components of the machine shown in FIG. 1;

FIG. 4 is an enlarged perspective view of a preferred form of diaper blank as formed on the apparatus of the present invention with portions broken away to better illustrate the internal construction;

FIG. 5 is an enlarged fragmentary perspective view of a portion of the machine shown in FIG. 1;

Figure 9:
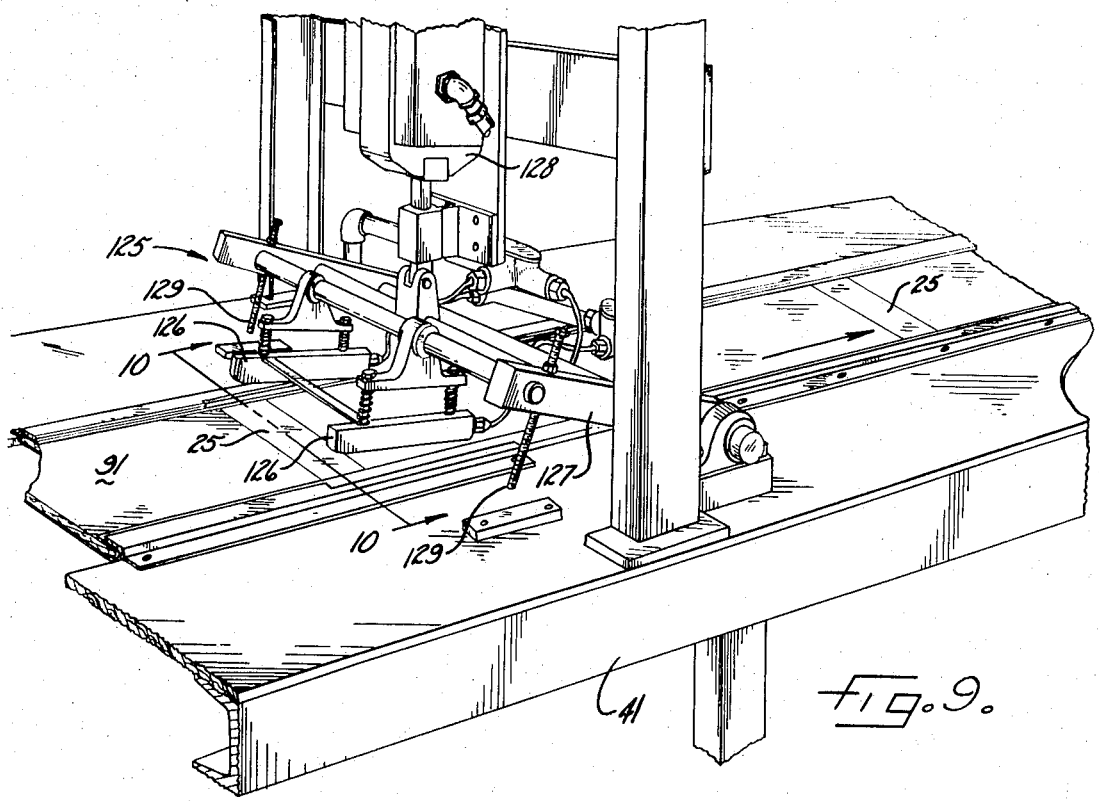
Figure 10:
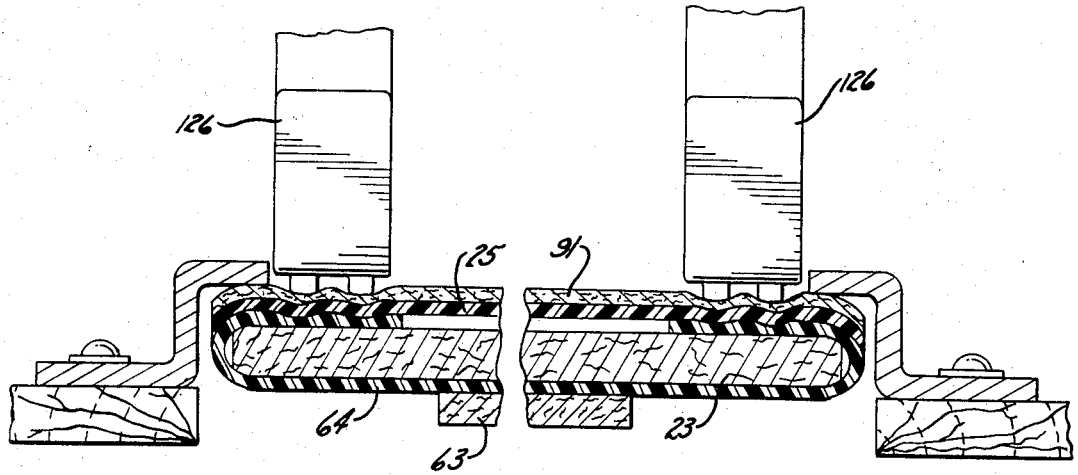

FIGS. 6 and 6a are, respectively, enlarged fragmentary sections taken along lines 6—6 and 6a—6a in FIG. 5;

FIGS. 7 and 7a are enlarged fragmentary sections taken along line 7—7 in FIG. 2, with certain of the components in FIG. 7a shown rotated through 180° from their positions in FIG. 7;

FIG. 8 is a fragmentary section taken substantially along line 8—8 in FIG. 7;

FIG. 9 is an enlarged fragmentary perspective view of another portion of the machine shown in FIG. 1; and, FIG. 10 is an enlarged fragmentary section taken along line 10—10 in FIG. 9.

Turning now to the drawings, there is shown in FIG. 1 an illustrative machine 15 for making diapers 20 according to the present invention. Preferably, the diapers made on the machine 15 are of the type disclosed in copending Endres application Ser. No. 715,301, which application is also assigned to the instant assignee. As disclosed there and as illustrated in FIG. 4 of this application, the preferred diaper 20 has a fluid-pervious cover sheet 21, a fluid-impervious backing sheet 22, and a central core 23 comprising a substantially rectangular batt of absorbent material. The longitudinal edge portions 22a of the backing sheet 22 are folded over the respective edge portions of the core and attached to the cover sheet 21 along these edges in a narrow area 24 substantially coextensive with the edges of the core 23. The ends of both the backing sheet 22 and the cover sheet 21 extend beyond the front and back edges of the absorbent core 23 and have a thin strip 25 of plastic film interposed between them. The plastic strip 25, cover sheet 21, and backing sheet 22 are heat-sealed to each other along a line 26 immediately adjacent the ends of the core 23. The edge of the thin plastic strip opposite from the heat-seal line 26 extends inwardly beneath the cover 21 and over the top of the absorbent core 23 for a distance sufficient to overlie the core ends and form a fluid-retaining pocket around the ends. This construction serves to hold sudden gushes of fluid within the pocket and substantially prevents end leakage as long as the absorbent core itself has some fluid capacity left.

The type of material used in the absorbent core 23 is not critical. It may comprise a layer of cellulosic fluff from wood pulp, multiple layers of cellulose wadding, absorbent cotton or rayon fibers, or any similar material with suitable absorbent properties.

The cover sheet 21 may consist of any fluid-pervious material and may consist of hydrophilic or hydrophobic components. The cover sheet should be soft and flexible and substantially non-adherent to the skin when either dry or wet. Non-woven webs are especially suitable and may comprise natural or synthetic fibers, or mixtures thereof. Thead-reinforced non-woven webs or cellulose wadding are also suitable. The prime characteristic necessary for the cover sheet is that it pass fluids rapidly while retaining substantially no fluid on the surface. As is well known, when such a sheet is placed in contiguous relationship to an underlying element having high absorptive capabilities, such as wood pulp fluff, the capillary attraction exerted by the latter is sufficient to rapidly draw fluid away from the surface of the cover sheet and keep the sheet relatively dry.

The underlying fluid-impervious backing 22 may be of polyethylene sheet stock or other thin plastic films such as polypropylene, polyvinylchloride or the like, which in thin calipers are soft and flexible enough to conform to the body. Use of such material, of course, eliminates the need for supplementary rubber or plastic pants. Laminates of such films with a light weight tissue may also be used. A particularly useful material is a one mil thick, white-pigmented taffeta-embossed polyethylene.

The thin plastic film for the barrier strip 25 is also preferably of a flexible sheet stock having the above properties. A particularly suitable film is a smooth clear polyethylene 1 mil thick. It is preferred that this element be as thin as possible and still perform its function. While thicker films provide greater strength, films as thin as ½ mil have proved satisfactory where a high degree of additional strength in the end of the diaper was not required.

The size of the diaper may vary according to needs. One suitable finished size is 12½" x 17½". Of the elements comprising the diaper, the cover sheet 21 is 12½" x 17½"; the backing sheet 22 is 15" x 17½", whereby each edge may be folded back over the top of the core a little more than 1"; the core 23 is 12½" x 16" so that the cover and backing extend approximately ½" beyond each end to allow for heat sealing; and the plastic film insert 25 is 12½" x 2½", extending across the entire width of the diaper and into the interior about 2".

In manufacturing the diaper in accordance with the present invention, 5" strips of plastic are used as the base material for the barrier dam. As will be described below these strips are cut and placed to overlie the ends of two adjacent core pads under a continuous cover sheet. When the continuous assembly is cut transversely between pads and simultaneously heat-sealed to form the individual diapers, the strip is also cut in half so that one-half forms the dam for the rear of the leading diaper, while the other half forms the dam for the front of the next following diaper.

As shown in FIG. 1, the material for the cover 21, backing sheet 22, core 23 and the plastic strip 25 are continuously fed into the machine 15 from respective supply rolls 31, 32, 33 and 35. The supply roll 33 of core material is suitably supported at the entrance end of the machine 15 by a standard 36 carrying an arm 37 from which a support shaft 38 projects. Preferably, a sleeve 39 is journalled on the shaft and is externally dimensioned to be received within the central opening of the supply roll 33. The arm 37 may also be provided with a second shaft 38a and sleeve 39a on which a new supply roll of core material (not shown) may be mounted before the initial supply roll 33 is completely exhausted.

Each of the other supply rolls 31, 32 and 35 is preferably wound on a shaft 31a, 32a and 35a and these shafts are suitably journalled and supported by similar cradle assemblies 40 secured to the frame 41 of the machine 15. Each cradle 40 includes a pair of laterally spaced support arms 42 (only one shown) adapted to straddle the ends of the respective supply rolls 31, 32 and 35 and journal the shafts 31a, 32a and 35a in a cup shaped notch 43. The arms 42 may also be provided with a second notch 43a to receive the shaft of a second supply roll (not shown) before the initial roll is entirely used. Each cradle 40 is also preferably provided with an adjusting means, shown here as a screw 45, for changing the angle of the cradle 40 so that the material from the supply rolls 31, 32 and 35 is fed straight into the machine 15.

Referring now to FIGS. 1–3 and 5, a relatively thick layer 53 of core material is drawn from supply roll 33 over a guide tray 50 by a pair of feed rolls 51 and 52, which are preferably spaced so that the layer 53 of core material is slightly compressed as it passes through the rolls. The guide tray 50 is cantilevered from a rod 55 pivotally mounted in a pair of support arms 56 secured to the standard 36 and is biased against the supply roll 33 by the moment afforded by an oppositely projecting weighted arm 57 secured to the rod 55. In this way the layer 53 of core material is drawn evenly from the roll 33 and is guided and supported as it passes into the feed rolls 51, 52.

From the feed rolls 51, 52 the layer 53 of core material is fed between a pair of cut-off rolls 61, 62 and onto a conveyor belt 63 which also draws a web 64 of the backing material from supply roll 32. It will be understood that the cut-off rolls cut the layer 53 of core material into lengths determined by the circumference of the rolls 61, 62, for example 16 inches. As shown in FIG. 1 the feed rolls are driven by suitable timing chains or the like from a gear box 65 coupled to a drive shaft 66 which is rotated by an external power source (not shown). The cut-off rolls 61, 62 are also driven from the drive shaft 66 through a gear box 67 in a similar manner.

In order to space the blanks 23 of core material apart on the backing sheet web 64, the conveyor 63 is driven at a speed slightly faster than the peripheral speed of the feed rolls 51, 52 and cut-off rolls 61, 62. If the diapers are to be 17½" long, the 16" core pads are spaced 1½" apart. A pair of hold down straps 68 help to position the core pads 23 on the web of backing material. The drive for the conveyor 63 is also from the shaft 66 through a gear box 69 by suitable timing chains or belts. In the machine illustrated the gear box 69 also drives a sealing and cut-off unit 70 to be described below.

As the web 64 of backing material and the spaced blanks of core material travel on the conveyor 63, the edges of the web 64 are raised and folded over the edges of the core blanks 23. For this purpose the machine 15 is equipped with a pair of laterally spaced folding bars 71, 72, one on each side of the conveyor 63 (see FIGS. 5, 6 and 6a).

In accordance with the present invention, the barrier strips 25 are cut from a continuous web 75 of material on supply roll 35 and are placed to overlie the ends of two adjacent core pads 23 and bridge the space between the pads by a vacuum transfer and cut-off apparatus 80 positioned above the conveyor 63. Referring now to FIGS. 3, 7, 7a and 8 the web 75 is drawn from the roll 35 by a pair of feed rolls 81, 82 journalled by bearings in framing elements of the apparatus 80. The feed rolls are preferably provided with resilient covers 83 and the pressure between rolls may be adjusted by suitable means such as an adjusting screw 84 and biasing spring 85 (see FIG. 7).

On the egress side of the feed rolls 81, 82, the web 75 is fed into the nip of a pair of cut-off rolls 86, 87 also journalled by bearings in frame elements of the apparatus 80. In the apparatus illustrated, the roll 86 carries an adjustable knife edge 88 positioned to strike an elongated anvil 89 on the roll 87. It will be understood that a strip of the barrier material is cut off the web during each revolution of the rolls 86, 87.

To carry the cut strip of barrier material to the conveyor 63 and place it over the ends of a pair of adjacent core pads, the apparatus 80 includes a pair of vacuum rolls; one of which, in the preferred embodiment, is the roll 87. Another vacum roll 90 engages the roll 87 from below and is disposed just above the conveyor 63. As shown in FIGS. 3, 7 and 7a, the web 75 of material from the feed rolls 81, 82 drapes over the surface of the roll 87. After a strip of material is cut from the web it is carried on the surface of the roll 87 to the nip formed with roll 90 where it meets a continuous layer 91 of the cover material drawn from supply roll 31. At this point, the vacuum within roll 87 is broken and the strip is transferred to and carried by roll 90 along with the cover layer 91 and placed over the ends of two core pads 23 (see FIG. 7a). Since this cover layer 91 is made of a fluid-pervious material the vacuum within roll 90 is effective to hold the barrier strip against cover layer until the vacuum is broken. Thus as the cover layer 91 is laid over the core pads 23 by the roll 90, the strip is inserted between the layer 91 and the ends of adjacent core pads.

As shown in FIG. 8 vacuum roll 90 includes a hollow, cylindrical shell 92 journalled by bearings 93 on a centrally disposed shaft 94 which is secured, such as by a key 95, to the frame of the apparatus 80. The shaft 94 is also hollow and is coupled to a vacuum pump 96 (see FIG. 1) by a conduit 97, only a portion of which is shown in FIG. 8. The shaft is further provided with a pair of elongated slots 101, 102 for slidably retaining sealing vanes 103, 104 which are biased by springs 105 against the inner periphery of the shell 92. Between the vanes 103, 104 the shaft 94 is cross bored at 106 to provide communication for the vacuum. Ths, a vacuum is drawn only in the left-hand half (as seen in FIG. 7) of the roll 90. The interior construction and mounting arrangement of the roll 87 is similar although its sealing vanes 107, 108 and cross bored apertures 109 are located so the vacuum is drawn only in the right-hand half of this roll.

It will be understood that the feed rolls 81, 82 cut-off roll 86 and vacuum rolls 87, 90 are driven in timed relation with the movement of the core pads 23 and backing sheet 22 on the conveyor 63. For this purpose a gear transfer case 110 driven by drive shaft 66 is coupled to cut-off roll 86 by a suitable chain 111 and sprocket 112 (see FIGS. 1 and 8). A gear 113 on the cut-off roll shaft drives vacuum roll 90 through a gear 114 secured to the shell 92. Another gear (not shown) on the shell of roll 87 is also driven by gear 113. The sprocket ratio and gearing arrangement for the rolls 86, 87 and 90 is such that they all are rotated with a peripheral speed equal to the speed of conveyor 63 and each of these rolls has an effective circumference equal to one diaper length, for example 17½ inches.

The length of the barrier strip is governed by the rotational speed of the feed rolls 81, 82 relative to the rolls 86, 87 and 90. As shown in FIG. 8, feed roll 82 has a sprocket 115 keyed on one end which is driven by a chain 116 and a sprocket 117 keyed on the shaft of the cut-off roll 86. A gear 118 on feed roll 82 drives feed roll 81 through another gear not shown. In the example given previously a 5" strip is cut and therefore the number of teeth on sprockets 115 and 117, respectively, may be 10 and 34, for example.

From the foregoing it will be seen that feed rolls 71, 82 rotate slower than cut-off rolls 86, 87. Thus, prior to cutting, the web 75 of barrier material is slippingly engaged on the surface of roll 87 which is preferably perforated around its periphery with rows of apertures 120 through which the vacuum is drawn. The lower vacuum roll 90 is, however, preferably perforated with apertures 121 over only a portion of its periphery since only a 5" strip is carried by the vacuum drawn through this roll.

Following placement of the barrier strip and cover layer over the core pads 23, the composite web is fed into an edge sealing apparatus 125. In the illustrated machine 15, the edeg sealing is accomplished by the application of heat sufficient to activate the thermoplastic characteristics of the folded over edges of the backing material. As shown in FIGS. 9 and 10 a pair of heating irons 126 are resiliently mounted above the edges of the moving web by a support frame 127. The support frame is preferably pivotally mounted on the machine frame so that it may be raised and lowered by suitable means, such as a air cylinder 128. The frame 127 also carries a pair of adjusting screws 129 to control the working height of the heating irons 126. In the illustrated machine, heat for the heating irons may be supplied by electrically energized heating elements enclosed within the irons, but other heat sources can also be used.

Following the edge sealing operation the composite web is smoothed out by a spreader 130 resiliently mounted on the machine frame and then the web is slightly flattened by an idling roller 131 journalled by a pair of arms 132 pivotally mounted on the machine frame. The working height of the roller 131 and thus its flattening effect is controlled by an adjusting bolt 133 at the free end of each arm 132. The cooperation between the idling roller 131 and the conveyor 63 also directs the web of material into the end sealing and cut-off unit 70.

In the space between adjacent core pads 23, the cover sheet 21, backing sheet 22 and the barrier strip 25 are pressed and bonded together. As best seen in FIG. 3, the end seal in the illustrated machine 15 is made by a pair of rotating sealing rolls 135, 136, formed with elongated sealing lobes 137, 138 which come together in timed sequence to press and bond together the components of the web between core pads 23. The upper sealing roll 135 is preferably heated such as by electrically energized heating elements 139. The faces of the sealing lobes 137, 138 may be formed to make two adjacent sealing lines, one on each side of the transverse center line between core pads 23, or they may be essentially flat to bond the entire area between core pads. In either case it is important, however, that the end sealing apparatus be effective to form a continuous cross seal on either side of the center line between core pads.

Synchronized for rotation with the sealing rolls 135, 136 are a pair of cut-off rolls 140, 141 which are timed to cut the material along the transverse center line between adjacent core pads 23 and thus separate the moving web into individual diapers 20. The cut diapers are discharged onto a conveyor 142 for delivery to suitable folding or packaging apparatus (not shown). The cut-off rolls may each be provided with elongated cutting elements 143, as shown in FIG. 3, or one may be provided with such a cutting edge and the other a cooperating anvil. It should be understood, of course, that other forms of end sealing and cut-off apparatus may also be employed without departing from the present invention.

As previously mentioned, the end sealing and cut-off unit 70 is driven from the drive shaft 66, through a gear box 69 by suitable timing chains or the like. Preferably, the sealing rolls 135, 136 and cut-off rolls 140, 141 are interconnected by meshing gears (not shown) to keep the rotation of the rolls synchronized. Also, since the conveyor 63 is driven from gear box 69, it will be appreciated that rotation of the sealing rolls and cut-off rolls is always properly timed relative to movement of the conveyor.

Pursuant to another aspect of the present invention, provision is made for applying controlled quantities of perfume to the diapers as they are being made. Also in order to retain the essential essence of the perfume as long as possible, the perfume is preferably applied to the absorbent core 23 near one end where it will be covered on one side by the impervious backing sheet 22 and on the other side by the impervious barrier strip 25. Accordingly, in the illustrative machine the perfume is applied to the core material at the entrance end of the machine.

As shown in FIGS. 1–3, the perfume is applied to the underside of the core material by a pair of perfume guns 150 as the core material is drawn from the roll 33. The guns 150 are preferably of the solenoid-actuated type and are electrically controlled by a light 151 and photocell 152 (see FIG. 1b) in combination with appropriate circuitry (not shown). When the photocell "sees" the light the circuit is energized actuating the guns 150. The location of the light 151 and photocell is not critical and in the illustrative machine 15 they are located below the sealing and cut-off unit 70.

To control actuation of the perfume guns 150, a rotatable timing disc 154 is interposed between the light 151 and photocell 152 which are mounted on a bracket 155 in alignment with an aperture 156 in the disc. As the disc rotates, the photocell sees the light as the aperture passes by on each revolution. The disc is mounted on a shaft 157 journalled in bearings 158 secured to the machine frame 41 and the bracket 155 is pivotally mounted on a support 159 coaxially of the shaft 157. Rotation of the disc 154 is timed with the other functions of the machine 15. In this instance the disc is driven from drive shaft 66, through gear box 69 by suitable drive chains or the like such that the disc makes one revolution for each 16" length of core mterial drawn into the machine by the feed rolls 51, 52. The exact location of the perfume relative to the ends of the subsequently cut core blanks 23 may be controlled by rotating the bracket 155 about its mounting pivot. The quantity of perfume applied by the guns may be controlled by regulating the duration of actuation of the guns, such as by a pulse timer in the control circuitry (not shown).

The overall operation of the machine 15 and the method by which the diapers 20 are made should now be apparent to those skilled in the art. However, the following brief summary may also be helpful.

As the layer 53 of core material is drawn from supply roll 33 by feed rolls 51, 52, controlled quantities of perfume are squirted on the underside of the layer at discrete spots by the perfume guns 150 so that these perfumed spots are located near the end of the core blanks 23 when they are cut off by rolls 61, 62. The core blanks 23 are then deposited on a web 64 of the impervious backing material drawn from supply roll 32 and moving along the upper surface of conveyor 63. A web 75 of barrier material is drawn from roll 35 by feed rolls 81, 82 and a strip is cut by rolls 86, 87. The cut strip is carried partially around roll 87 by vacuum attachment to the nip formed wtih roll 90 where a layer 91 of cover material is fed from supply roll 31. Vacuum drawn through roll 90 carries the barrier strip through a partial revolution and places it over the ends of two adjacent core pads 23 traveling on the moving web 64 of backing material. The cover layer 91 is also simultaneously laid over the core pads 23 and barrier strip 25 by the roll 90.

The edges of the composite web are then sealed by sealing irons 126 and, after the web is spread and somewhat flattened, the material between core pads 23 is bonded together by sealing rolls 135, 136 and successive diapers 20 are cut off by rolls 140, 141. The individual diapers are then discharged onto conveyor 142 for delivery to suitable folding or packaging apparatus.

While the invention has been described in connection with certain preferred embodiments and procedures, it is not intended to so limit the invention. Rather, it is intended to include such other alternative and equivalent embodiments and procedures as fall within the spirit and scope of the appended claims.

What is claimed is:

1. A disposable diaper forming machine comprising, in combination, a continuous conveyor belt, means for supplying a continuos web of backing material to the conveyor belt, means for depositing blanks of absorbent core material in spaced-apart, end-to-end relation on the backing web, means for placing strips of fluid-impervious material over the spaces between blanks and across the end portions of adjacent blanks, means for applying a continuous cover of pervious material over said strips and blanks.

means for bonding the portions of the backing material, the strips of impervious material and the cover material together on opposite sides of a transverse line located centrally in the space between said blanks, and means for cutting the composite web apart along said transverse line to separate the web into individual diapers.

2. A machine as defined in claim 1 wherein said second recited means includes a pair of feed rolls and a pair of cutting rolls for drawing absorbent core material from a supply roll and cutting it into blanks, said feed rolls and cutting rolls being rotated at a peripheral speed less than the speed of said conveyor belt in order to deposit said blanks on said web in spaced-apart relation.

3. A machine as defined in claim 2 including a perfume gun located between said supply roll and said pair of feed rolls for squirting controlled quantities of perfume on the absorbent core material and a control for said gun effective to time actuation of said gun so that the perfume is applied to the core at a location which, after said blanks are cut, is covered by one of said strips of fluid-impervious material.

4. A machine as defined in claim 1 wherein said third recited means includes a pair of feed rolls and a pair of cutting rolls for drawing fluid-impervious material from a supply roll and cutting it into strips, said feed rolls being rotated at a peripheral speed less than the speed of said conveyor and said cutting rolls being rotated at a speed equal to the speed of said conveyor.

5. A machine as defined in claim 4 including a pair of vacuum transfer rolls one of which is also one of the pair of cutting rolls, said transfer rolls forming a nip through which said cover is fed and including internal vacuum restricting vanes operable to effectuate the transfer of said strip from said one vacuum transfer roll which is also a cutting role to the other vacuum transfer roll for placement over the ends of and the spaces between adjacent blanks and beneath said cover.

References Cited
UNITED STATES PATENTS

| | | | |
|---|---|---|---|
| 3,159,521 | 12/1964 | Pechmann | 156—519 X |
| 3,226,282 | 12/1965 | Jackson | 156—519 |
| 3,295,526 | 1/1967 | Sabee | 128—287 |
| 3,085,575 | 4/1963 | Woskin | 19—144.5 X |
| 1,132,901 | 3/1915 | Bates | 156—517 |

ALFRED L. LEAVITT, Primary Examiner

B. J. LEWRIS, Assistant Examiner

156—383, 467, 519, 521, 522, 552, 559, 301; 128—284, 287, 290